United States Patent
Koseki et al.

(10) Patent No.: US 6,944,852 B2
(45) Date of Patent: Sep. 13, 2005

(54) COMPILER

(75) Inventors: Akira Koseki, Sagamihara (JP);
Hiroyuki Momose, Chigasaki (JP);
Motohiro Kawahito, Sagamihara (JP);
Hideaki Komatsu, Yakohama (JP)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 09/828,402

(22) Filed: Apr. 6, 2001

(65) Prior Publication Data

US 2002/0049965 A1 Apr. 25, 2002

(51) Int. Cl.[7] .............................................. G08F 9/45
(52) U.S. Cl. ..................................................... 717/151
(58) Field of Search ........................................ 717/151

(56) References Cited

U.S. PATENT DOCUMENTS

| | | | | | |
|---|---|---|---|---|---|
| 5,230,050 | A | * | 7/1993 | Iitsuka et al. | 717/145 |
| 5,613,118 | A | * | 3/1997 | Heisch et al. | 717/158 |
| 5,655,122 | A | * | 8/1997 | Wu | 717/152 |
| 5,950,009 | A | * | 9/1999 | Bortnikov et al. | 717/158 |
| 6,275,981 | B1 | * | 8/2001 | Buzbee et al. | 717/158 |
| 6,631,515 | B1 | * | 10/2003 | Berstis | 717/140 |

\* cited by examiner

*Primary Examiner*—John Chavis
(74) *Attorney, Agent, or Firm*—Ference & Associates

(57) ABSTRACT

A compiler is provided which effectively performs a data flow optimization process for a program wherein a plurality of branches and merges are arranged in series, without incurring a drastic increase in the amount of code. The compiler, and the method thereof, may be implemented in hardware, software, or both.

16 Claims, 12 Drawing Sheets

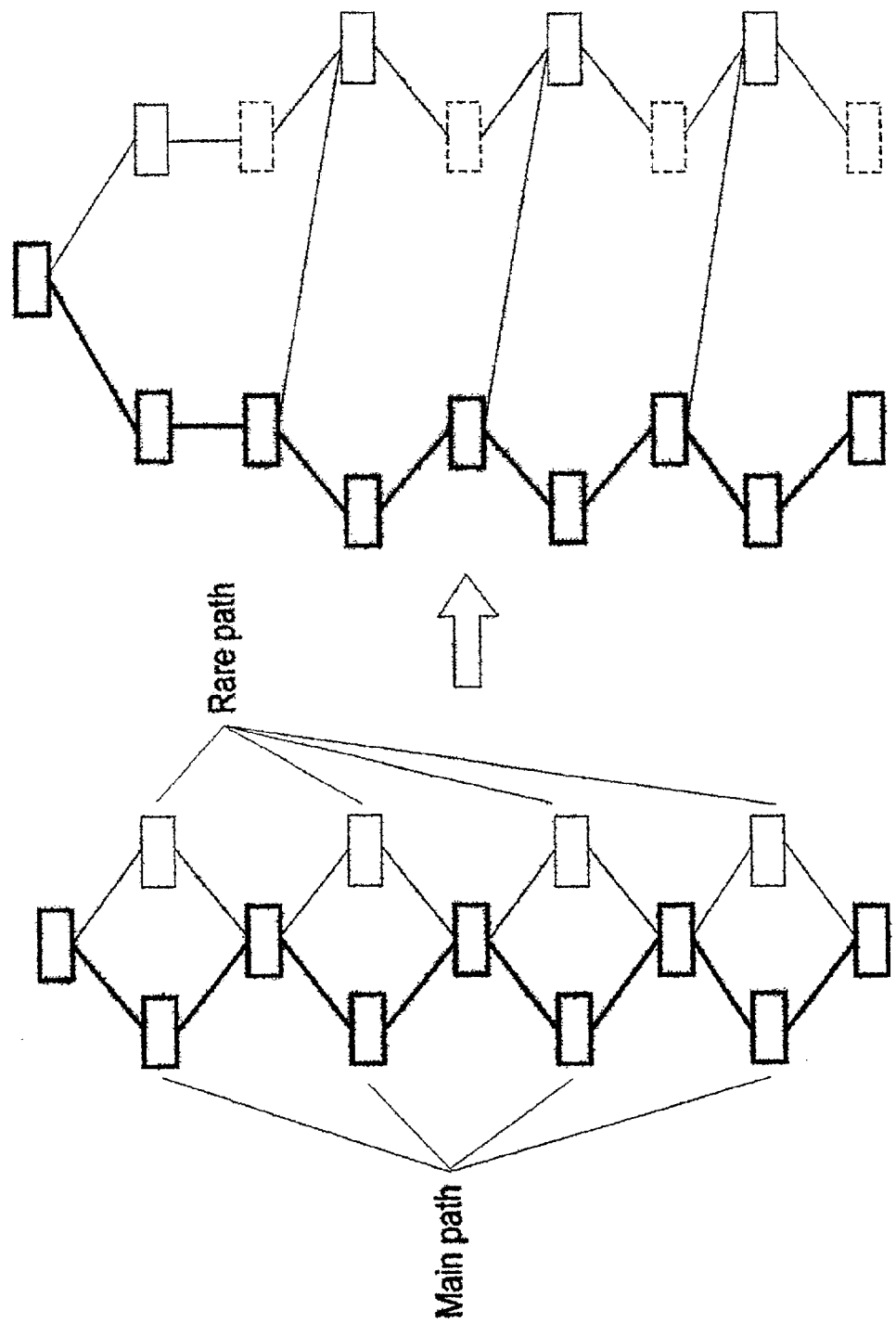

COMPILER

CLAIM FOR PRIORITY

This application claims priority from Japanese Application No. 2000-105468, filed on Apr. 6, 2000, and which is hereby incorporated by reference as if fully set forth herein.

1. Field of the Invention

The present invention relates to a compiler that can effectively optimize a program that includes branches.

2. Background of the Invention

Normally, before the source code for a program written in one of the high-level programming languages is finally compiled, code optimization is employed to improve the execution performance and the efficiency of the machine language executable program into which the source code is converted.

However, when the program includes branches, the optimization effects are generally deteriorated. Especially for data flow optimization, which is an important optimization process, the effects obtained by optimization are considerably deteriorated for a program that includes branches. This is because, in the data flow analysis used for the data flow optimization, when the program includes branches, the execution results provided by the code used for branched paths adversely affect the operation that is to be performed after the branches have been merged, so that efficient optimization is difficult.

Among the branches that appear in a program, there is a branch whereat the execution frequencies of the individual paths are very biased and the program almost always branches in one direction only. However, in data flow optimization, the affect of the code along a path to which the program seldom branches can not be ignored at all. Therefore, since the affect of the code along the path to which the program seldom branches must be taken into account, the optimization effects are deteriorated.

Conventionally, to perform data flow optimization, a method is employed whereby a point at which branches merge is simply removed, even when branches are present in a program. FIG. 11 is a diagram showing the eventual state when a program is developed using this method. As is shown in FIG. 11, according to this method, a command positioned following a branch merging point is copied, and the command copies are portioned following the branched paths (portions preceding the merging point). These commands are transformed into special codes that depend on several contexts of the individual branches. Therefore, the branches are not merged, and are maintained separately and are handled as multiple processes. As a result, optimization can be performed for the process for each branched path, and the execution speed can be increased.

As is described above, among the optimization processes performed during the program compiling processing, especially the data flow optimization, the effects are deteriorated when a program includes branches. In particular, when, depending on the branches, the execution frequency is biased, the optimization effects are reduced due to the presence of code that is rarely executed during the actual processing.

On the other hand, according to the above conventional method, optimization can be accomplished by removing the merging point of branches. However, when a plurality of branches and merges are arranged in series in a program, the amount of code is increased exponentially in consonance with the number of branches. FIG. 12 is a diagram showing the eventual state when a program wherein multiple branches and merges are arranged in series is developed by removing merges, and the drastic, exponential increase in the amount of code that employing the procedure entails. As is evident from the diagram, when the amount of code is increased, realistically, an optimization process can not actually be performed. Therefore, conventionally, for this structured program effective optimization is impossible.

SUMMARY OF THE INVENTION

The present invention broadly contemplates effectively performing a data flow optimization process for a program wherein a plurality of branches and merges are arranged in series, without incurring a drastic increase in the amount of code. The present invention also contemplates a method whereby a control flow graph is effectively modified in order to perform a data flow optimization process for a program wherein multiple branches and merges are arranged in series, and wherein the execution frequency in these branches differs greatly.

In accordance with one aspect of the present invention, a compiler for converting source code for a program written in a programming language into an object program written in a machine language is provided, which comprises: an optimization execution unit for performing optimization of the object program written in the machine language; and a program modification unit for, before the optimization process is performed by the optimization execution unit, modifying the object program to provide a form that is appropriate for the optimization, wherein, when the object program includes a branch, the program modification unit selects at the branch a specific path to extract, relative to the branch, a series of paths that are not merged.

Since relative to the branch a series of paths that are not merged are extracted from the object program, even data flow optimization, which will produce code for the branched paths that will provide execution results that will affect the operation of the program after the branches are merged, can be performed without taking the branches into account. The optimization execution unit performs the optimization for the paths that are extracted by the program modification unit. Since a series of paths, which relative to the branch are not merged and which are extracted from the object program, is designated as the target for the optimization, optimization can be performed effectively. Especially, since the data flow optimization can be performed for a series of paths that are not merged relative to the branch, an extremely effective optimization process can be performed.

When differences in execution frequencies depend on a plurality of paths at the branch in the object program, the program modification unit selects a path having a higher execution frequency, and relative to the branch, extracts a series of paths that are not merged. This configuration is superior because the path to be optimized is a path having a high execution frequency, and thus the overall process efficiency of the optimized program can be greatly increased.

In accordance with another aspect of the present invention, a compiler, for converting source code for a program written in a programming language into an object program in a machine language provided, which comprises: a path determiner, for selecting, when the object program in the machine language includes a branch, a specific path at the branch for determining a series of target paths for optimization; a control flow graph modification unit, for modifying a control flow graph for the object program to separate the optimized target paths from other paths; and an optimization execution unit for employing the control flow graph obtained by the control flow graph modification unit to perform optimization of the optimization target paths.

With this arrangement, since the optimization process is performed for target paths that are extracted from the program, the paths are increased and it is not necessary, each time a branch appears, for a command at a branch merging point to be copied. Therefore, even for a program wherein branches and merges are arranged in series, the phenomenon can be avoided wherein the amount of code drastically increases as the program is developed.

The control flow graph modification unit extracts the optimization target paths from the control flow graph for the object program, and defines the optimization target paths as paths that, relative to the branch, are not to be merged; and copies path segments that are included in the optimization target paths and connects the copies of the path segments to paths other than those for the optimization target paths, thereby separating the control flow graph into the optimization target paths and into paths that are formed using the copies of the path segments and the paths that are not included in the optimization target paths. This arrangement is preferable because a series of executable paths can be formed for the program portion after the optimization target paths have been extracted from the program.

From among the paths included in the optimization target paths, the control flow graph modification unit copies path segments at locations other than those whereat the object program branches into a plurality of paths, and connects the copies of the path segments to the paths that are not included in the optimization target paths. This configuration is preferable because an increase in the amount of code after the control flow graph has been developed can be suppressed.

In accordance with another aspect of the present invention, a computer system is provided that includes a compiler, for converting source code for a program written in a programming language into an object program in a machine language is provided, which comprising: a path determiner, for selecting, when the object program in the machine language includes a branch, a specific path at the branch for determining a series of target paths for optimization; a control flow graph modification unit, for modifying a control flow graph for the object program to separate the optimized target paths from other paths; and an optimization execution unit for employing the control flow graph obtained by the control flow graph modification unit to perform optimization of the optimization target paths. This configuration is preferable because, for program compiling, this computer system provide effective optimization for a program wherein branches and merges are arranged in series.

In accordance with another aspect of the present invention, an optimization method for performing optimization to improve process efficiency of a program is provided, which comprises the steps of: selecting, when a program includes a branch, a specific path at the branch for determining a series of target paths for optimization; modifying a control flow graph for the program to separate the optimized target paths from other sub-paths; and employing the control flow graph obtained by the control flow graph modification unit to perform optimization of the optimization target paths. With this arrangement, even for a program wherein branches and merges are arranged in series, the phenomenon can be avoided wherein the amount of code drastically increases as the program is developed.

The step of modifying the control flow graph includes steps of: copying all optimization target paths, for a sub-path that is led to an optimization target path, that can be reached from a point whereto the sub-path is led; copying all the paths that extend from the point whereto the sub-path is led to the copied paths; changing the connections of all the edges of the optimization target path from the sub-path to the connections for the copied paths; changing, when there is an edge that externally flows to the optimization target path and when the edge is the edge of the sub-path, the connection of the edge connecting the edge to the copied paths; and forming a merging point, consisting of a first block at a starting point for the edge and a second block along a copied path that corresponds to the first block, and replacing an edge that flows out from the optimization target path with an edge from the merging point. This arrangement is preferable because a series of executable paths can be formed for the program portion after the optimization target paths have been extracted from the program.

At the two steps of copying paths, the copying of a path is eliminated for a location whereat the program branches into a plurality of paths. This configuration is preferable because an increase in the amount of code after the control flow graph has been developed can be suppressed.

In accordance with another aspect of the present invention, an optimization method for performing optimization in order to improve the processing efficiency of a program is provided, which comprises the steps of: when a program includes a branch, selecting at the branch a specific path from which to extract, relative to the branch, a series of paths that are not merged; and performing optimization for the paths that are selected.

Since a series of paths that are not merged relative to the branch can be defined as target optimization, an extremely effective optimization process can be performed particularly for the data flow optimization. At the step of extracting paths from the program, when differences in execution frequencies depend on a plurality of paths at the branch in the object program, a path having a higher execution frequency is selected, and a series of paths that are not merged are selected relative to the branch. This configuration is superior because the path to be optimized is a path having a high execution frequency, and thus the overall process efficiency of the optimized program can be greatly increased.

In accordance with another aspect of the present invention, an optimization program, for permitting a computer to perform optimization of an object program, is provided and comprises: a process for selecting, when the object program in the machine language includes a branch, a specific path at the branch for determining a series of target paths for optimization; a process for modifying a control flow graph for the object program to separate the optimized target paths from other sub-paths; and a process for employing the obtained control flow graph to perform optimization of the optimization target paths.

In accordance with another aspect of the present invention, a storage medium is provided on which input means for a computer stores a computer-readable program that permits the computer to perform: a process for selecting, when the object program in the machine language includes a branch, a specific path at the branch for determining a series of target paths for optimization; a process for modifying a control flow graph for the object program to separate the optimized target paths from other sub-paths; and a process for employing the obtained control flow graph to perform optimization of the optimization target paths.

In accordance with yet another aspect of the present invention, a program transmission apparatus comprises: storage means for storing a program that permits a computer to perform a process for selecting, when the object program in the machine language includes a branch, a specific path at the branch for determining a series of target paths for optimization, a process for modifying a control flow graph for the object program to separate the optimized target paths from other sub-paths, and a process for employing the obtained control flow graph to perform optimization of the optimization target paths; and transmission means for the reading of the program from the storage means and the transmission of the program. This configuration is preferable because, when a computer on which this program has been installed is operated as a compiler, effective optimization can be performed, even when a target object program includes branches.

For a better understanding of the present invention, together with other and further features and advantages thereof, reference is made to the following description, taken in conjunction with the accompanying drawings, and the scope of the invention that will be pointed out in the appended claims.

BRIEF DESCRIPTION OF THE DRAWINGS

FIG. 4 is a diagram showing a modification example for the control flow graph for this embodiment when main paths are not copied.

FIG. 6 is a diagram showing an example application of the algorithm for the control flow graph modification process in FIG. 5, wherein the control flow graph is modified while the path from a merging point 2 to a branching point 3 is focused on.

FIG. 7 is a diagram showing another example application for the algorithm for the control flow graph modification process in FIG. 5, wherein the control flow graph is modified while the path from a merging point 4 to the branching point 3 is focused on.

FIG. 8 is a diagram showing another example application for the algorithm for the control flow graph modification process in FIG. 5, wherein the control flow graph is modified while the path from the merging point 4 to the branching point 3 is focused on.

FIG. 9 is a diagram showing another example application for the algorithm for the control flow graph modification process in FIG. 5, wherein the control flow graph is modified while the path from the merging point 4 to a branching point 5 is focused on.

FIG. 10 is a diagram showing another example application for the algorithm for the control flow graph modification process in FIG. 5, wherein the control flow graph is modified while the path from the merging point 4 to the branching point 5 is focused on.

DETAILED DESCRIPTION OF THE PREFERRED EMBODIMENT

The presently preferred embodiment of the present invention will now be explained in detail while referring to the accompanying drawings.

Figure 1:
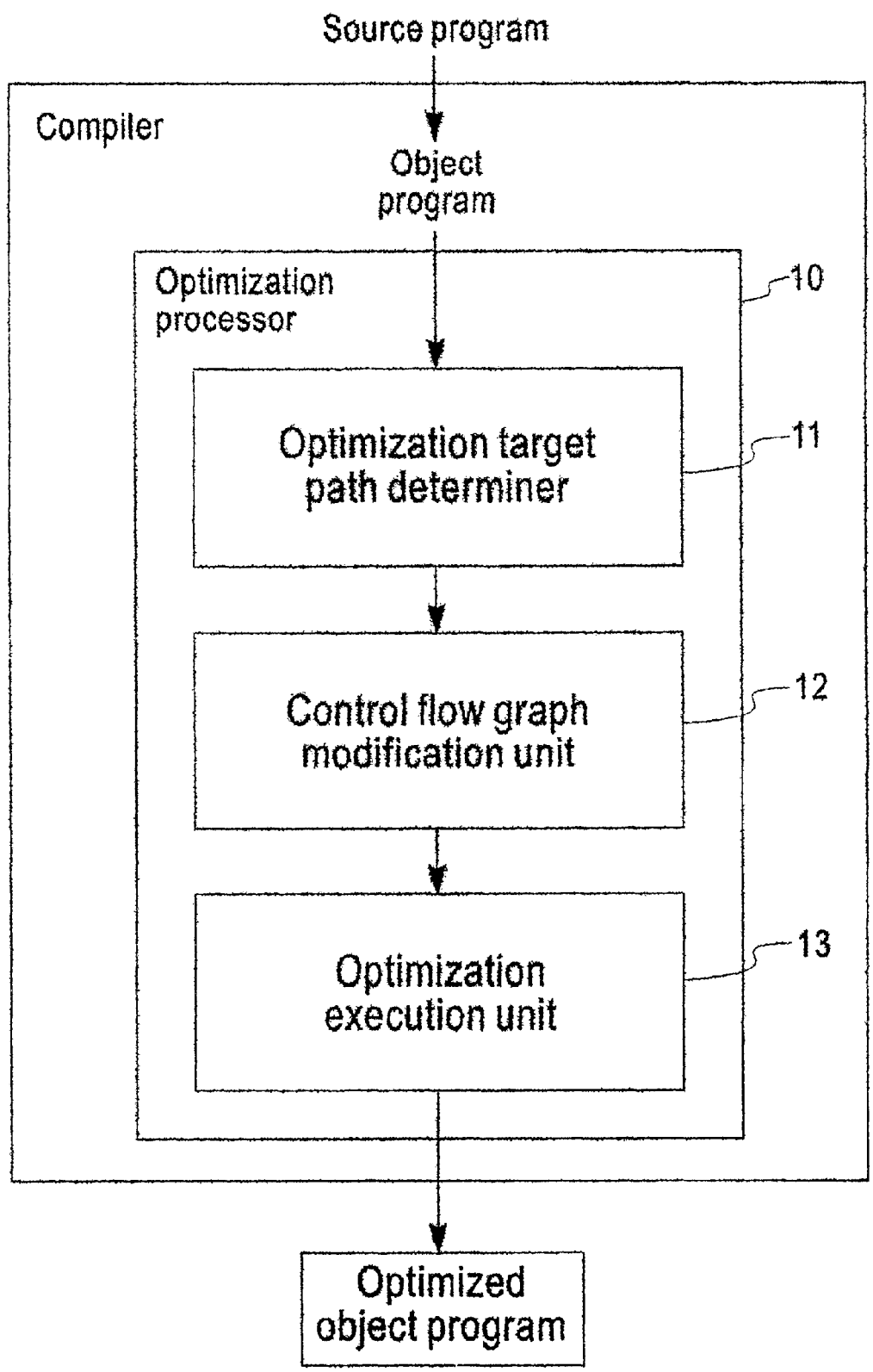
FIG. 1 is a diagram for explaining the configuration of an optimization processor in a compiler according to one embodiment of the present invention.

FIG. 1 is a diagram for explaining the configuration, according to the embodiment of the present invention, of an optimization processor included in a compiler. In FIG. 1, an optimization processor 10 optimizes a machine language object code program. An optimization target path determiner 11 determines which path, of multiple paths generated by branching the program, is to be optimized (hereinafter referred to as an optimization target path). A control flow graph modification unit 12 modifies a control flow graph for the target program based on the determination made by the optimization target path determiner 11, and an optimization execution unit 13 employs the control flow graph modified by the control flow graph modification unit 12 to perform an optimization process, including data flow optimization, for the optimization target path selected by the optimization target path determiner 11.

In the portion whereat the target program branches into multiple paths, the optimization target path determiner 11 selects an optimization target path from among those multiple paths, and merges the selected path into the path at the merging point in order to provide a path to be used as an optimization target. The path having the highest execution frequency (hereinafter referred to as a main path) is generally selected as the optimization target path. However, strictly speaking, the optimization target path does not always include all the main paths, and may include a path having a low execution frequency (hereinafter referred to as a rare path), or may include both a main path and a rare path. In the explanation for this embodiment, a main path is employed as the optimization target path.

The optimization target path is determined based on a resource available for the compiler, the branching frequency and the optimization scheme. The method for dynamically determining the optimization target path during the execution of the algorithm can also be employed.

The control flow graph modification unit 12 divides the control flow graph for the target program into an optimization target path, determined by the optimization target path determiner 11, and paths including the other paths. In this embodiment, since the main path is employed as the optimization target path, the control flow graph modification unit 12 divides the control flow graph into the optimization target path and the remainder of the paths, including the rare paths.

Since following the branching of the program the main path and a block at the merging portion are included in the optimization target path, if the control flow graph of the program is simply divided into two path types, the block at the merging point is omitted from the sub-paths, including the rare paths, and only an incomplete code array is obtained. Thus, a necessary block is supplemented.

Figure 2:
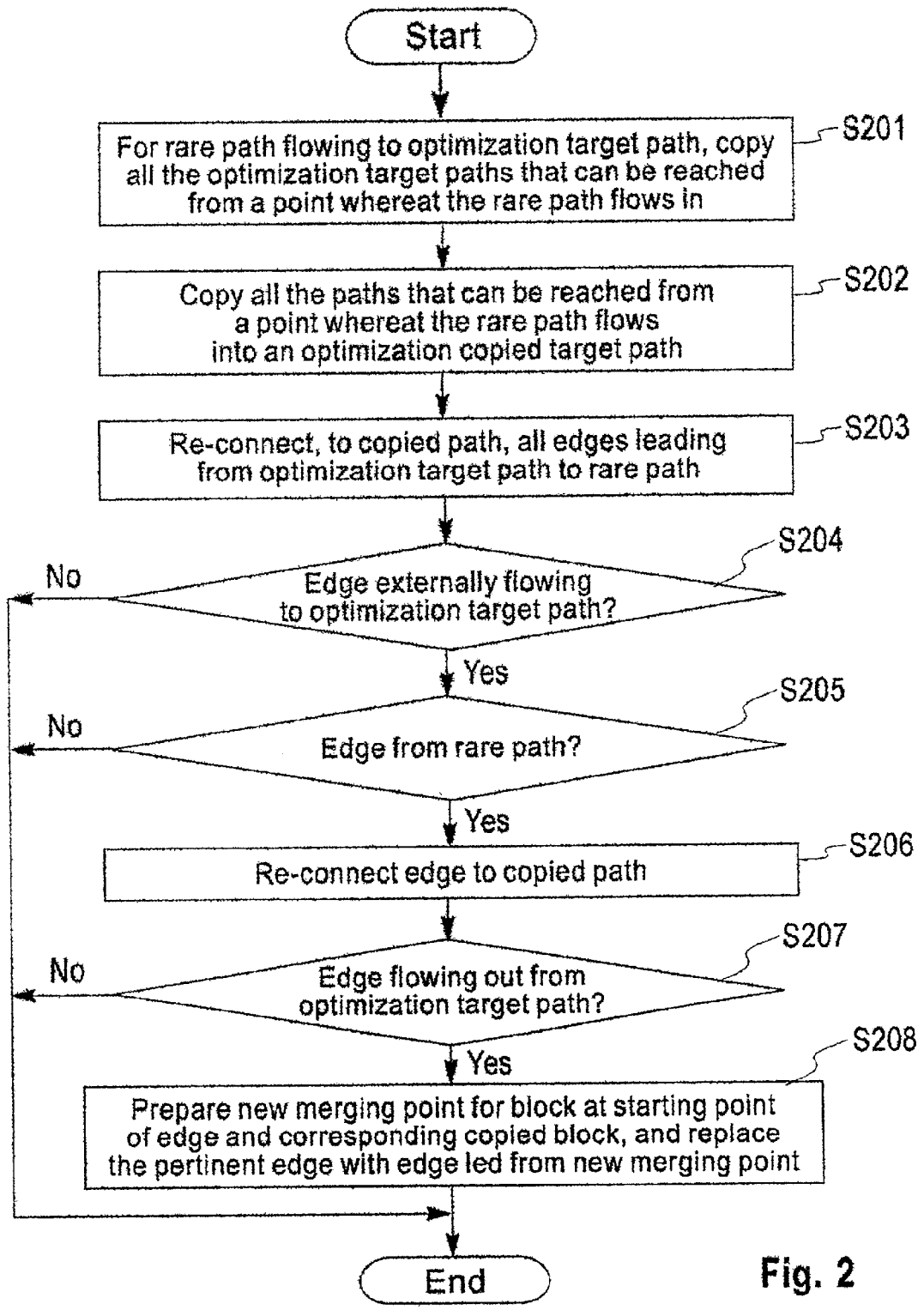
FIG. 2 is a flowchart for explaining the processing performed by a control flow graph modification unit according to the embodiment.

FIG. 2 is a flowchart for explaining the processing performed by the control flow graph modification unit 12. In FIG. 2, first, for a rare path that flows into a predetermined optimization target path, all the optimization target paths are copied that can be reached from the point at which the rare path flows into the predetermined optimization target path (step 201). Following this, all the paths are copied that can reach from the above described point to the optimization target paths that were copied (step 202). The connections of all the edges leading from the optimization target paths to the rare path are changed to those paths that were copied (step 203). If there is an edge that externally flows into the optimization target path, and if the pertinent edge is an edge from the rare path, the connection of this edge is changed and it is connected to a copied path (steps 204, 205 and 206). If there is no edge externally flowing into the optimization target path, or if the edge that is externally flowing into the optimization target path is not from the rare path, the connection of this edge to the optimization target path is not changed. Next, if there is an edge that flows out from the optimization target path, a new merging point for the block at the starting point for the edge and a corresponding copied block is prepared, and the edge is replaced with an edge from the new merging point (steps 207 and 208). The above processing is performed for all the rare paths that flow into the optimization target paths. For the processing performed for the other rare paths, portions that were previously copied are not copied again, and only a corresponding portion is performed.

Figures 3A, 3B:
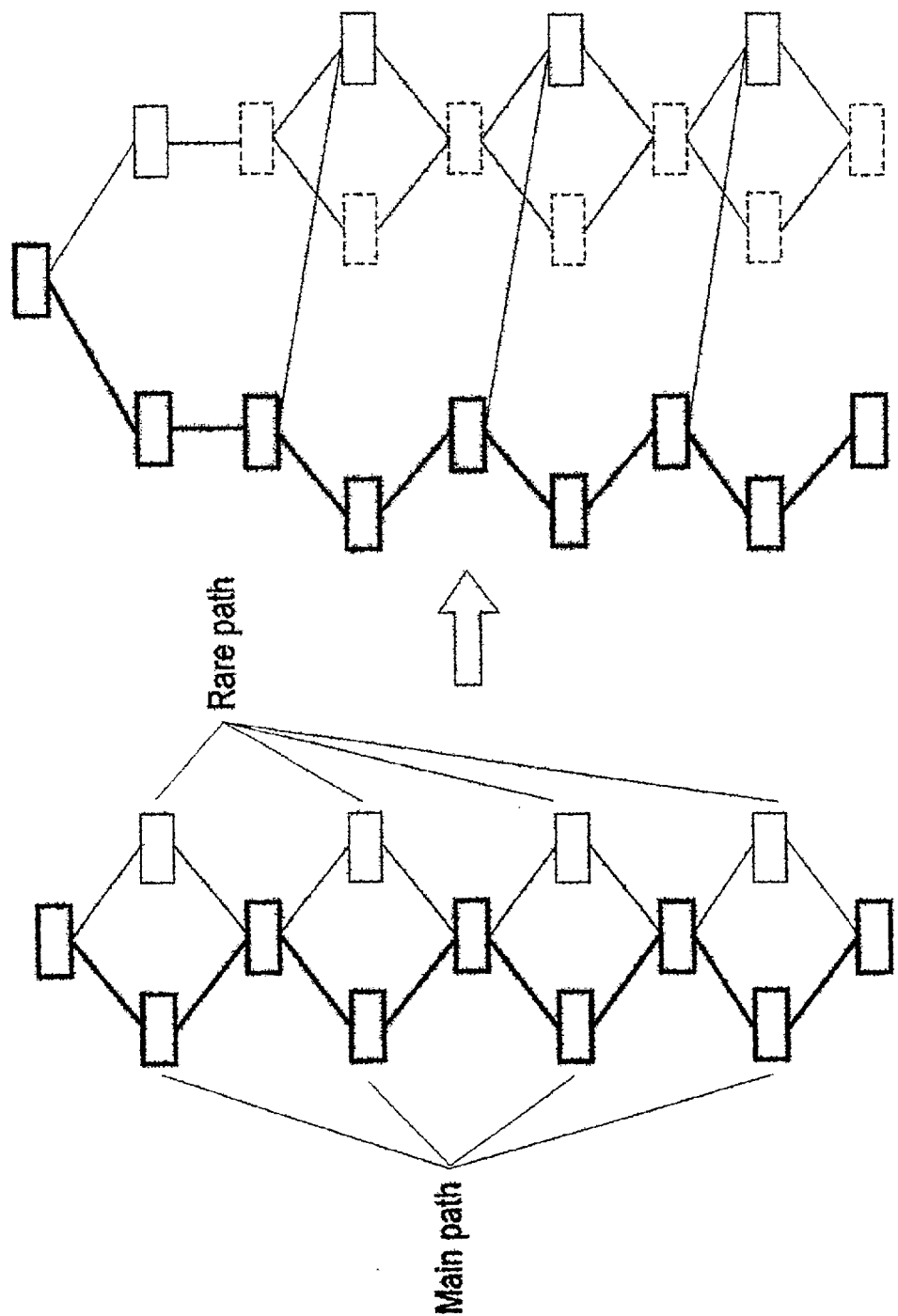
FIG. 3 is a diagram showing a modification example for the control flow graph of a program obtained by the control flow graph modification unit according to the embodiment.

FIGS. 3A and 3B are diagrams showing a modification example of the control flow graph for a program obtained by the control flow graph modification unit 12. In FIGS. 3A and 3B, paths indicated by thick lines are optimization target paths. As is shown in FIG. 3A, the main paths and the blocks whereat the paths are merged are selected as optimization target paths. By referring to FIG. 3B, which shows the modified state, block copies indicated by broken lines are generated by the processes at steps 201 and 202. Further, a necessary edge connection is performed by the process used from step 203 to step 208.

The optimization execution unit 13 performs the optimization process for the optimization target paths based on the control flow graph that is thus developed by the control flow graph modification unit 12. As is shown in FIG. 3, since the optimization target paths do not include branches, the effects are not deteriorated for all the optimization processes, including the data flow optimization.

Therefore, the processing performed by the optimization target path determiner 11, the control flow graph modification unit 12 and the optimization execution unit 13 in the optimization processor 10 correspond to the processing performed where a series of paths that do not merge at the branches is extracted from a program that includes branches, and the optimization process is performed only for the extracted paths. The processing efficiency of the optimized program can be improved when the program is executed along the paths for which the optimization has been performed. On the other hand, the process efficiency is not improved when the program is performed along the other paths. However, for the program whereby multiple branches and merges are arranged in series, as is shown in FIG. 3, since the optimization process can not actually be performed by the conventional method used for removing the merging points, the processing efficiency of the program in FIG. 3A is equivalent to the processing efficiency attained by the program performed by the conventional method.

Furthermore, as is shown in FIG. 3B, along the optimization target path, the edge to a rare path is connected to a portion where a branch was present before the control flow graph was modified. On the other hand, there is no edge connected to the portion whereat a branch is present before the control flow graph was modified. Therefore, for the execution of the program along the optimization target paths, the program is branched to the process along the paths including the rare paths, and the following process is performed along the paths that include the rare paths, i.e., the program that is not optimized is executed.

As is described above, in the embodiment, the program including the branches and merges is developed along the control flow graph, and the optimization target paths are obtained by removing the merges at the branches, and are optimized. Therefore, even the data flow optimization, for which the optimization effects are considerably reduced in the program that include branches, can be performed without deterioration of the effects. Further, in this embodiment, the optimization target paths are extracted from the program that includes the branches and for the other paths, the application of the optimization is not taken into account. Therefore, the program need not be developed for all the branches. Thus, even when the branches and merges are arranged in series in the program, the amount of code is not drastically and exponentially increased.

In addition, in the embodiment the main paths having high execution frequencies are selected to form optimization target paths. Therefore, when the program modification as is shown in FIG. 3B is executed, almost all the processes are executed along the optimized paths, and only when, as an exception, the program control is shifted along the rare path is the following process performed along the non-optimized path. Therefore, the overall processing efficiency can be considerably enhanced.

As a special program form having branches whose execution frequencies are biased, there is a program where the process for the main path is included in a rare path. In such a program, for example, when
if(a==0) then A else B,
the process B is generally written while a=0 is taken into account. This case appears during the devirtualization performed by an optimization compiler in an object oriented language. If the program control is shifted from a branch having this property to the rear path, the following process need only be performed along the rare path and the block at the merging portion, so that only the block at the merging portion is copied to the rare path side, while the main path is not doubled. As a result, an increase in the amount of code can be suppressed.

FIGS. 4A and 4B are diagrams showing the modification of the control flow graph when the main paths are not copied.

Comparing FIG. 4 with FIG. 3, the optimization target paths are identical and are formed of main paths and blocks at merging portions. The paths, including rare paths, are formed only of the copies of the blocks at the merging points and the rare paths, and the main paths are not copied. Therefore, branches are not present along the paths, including the rare paths, and only edges (merges) that flow from the optimization target paths are present.

Figure 5:
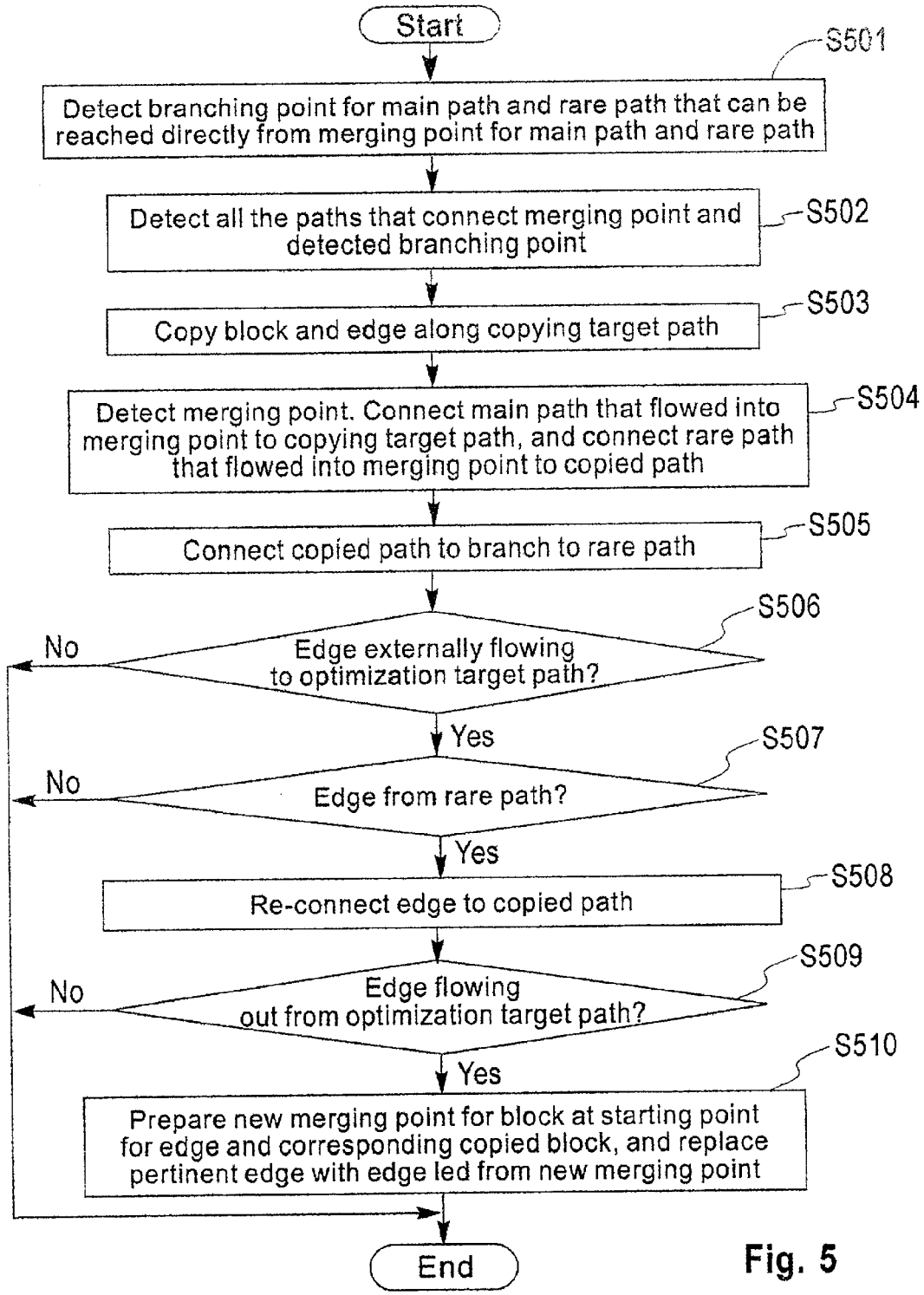
FIG. 5 is a flowchart for explaining the algorithm for the control flow graph modification process according to the embodiment.

FIG. 5 is a flowchart for explaining an algorithm for the control flow graph modification processing in this embodiment. Assume that, for all the branches to be processed by the algorithm, the processes along the main paths are included in the process along the rare paths. The selection of the optimization path is performed incrementally during the algorithm. That is, it may be understood that the optimization path is repetitively processed instead of the following copying target paths.

In FIG. 5, first, a branch point of a main path and a rare path, which can be reached from a predetermined merging point for a main path and a rare path, is detected (step 501). If such a branch point is not detected, the processing is thereafter terminated. Then, detect all the paths connecting the merging point and the detected branching point (step 502). The detected path is hereinafter called a copying target path. A block and an edge along the copying target path are copied (step 503). Then, the merging point is deleted, and the main path that flowed into the merging point is connected to the copying target path. Further, the rare path that flowed into the merging point is connected to the copied path (step 504). The copied path is connected to the branch to the rare path (step 505). If there is an edge that externally flows to the copying target path and if that edge is from the rare path, the edge is re-connected to the copied path (steps 506, 507 and 508). But if there is no edge that externally flows into the copying target path, or if an edge externally flowing into the copying target path is not from the rare path, the connection to the copying target path is maintained. If there is an edge flowing out from the coping target path, a new merging point for the block at the starting point for the edge and a corresponding copied block is prepared, and the above edge is replaced with the edge from the new merging point (steps 509 and 510). The above processing is recurrently repeated to modify the control flow graph.

FIGS. 6 to 10 are diagrams showing application examples of the algorithm explained while referring to FIG. 5.

Figure 6:
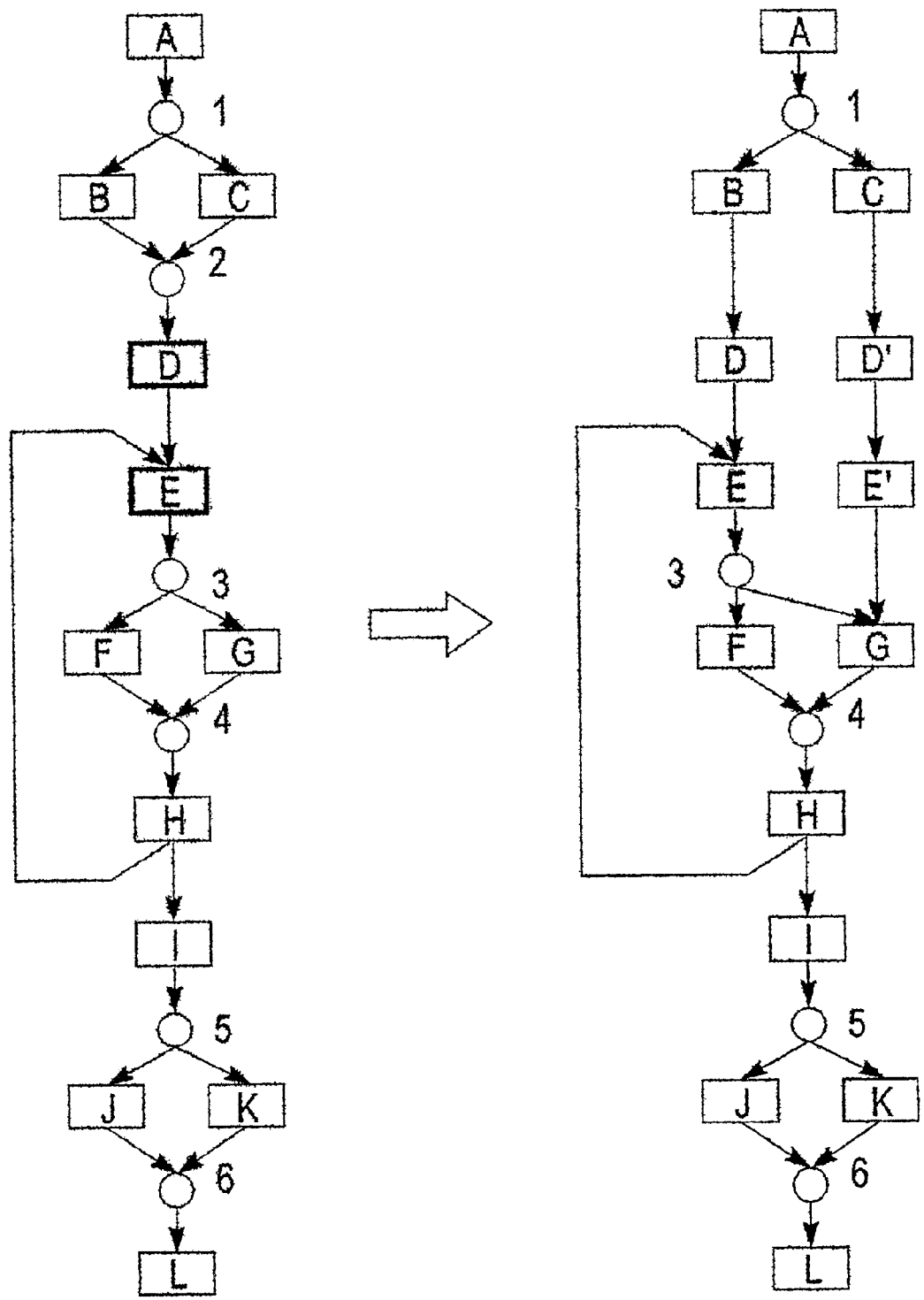

In FIG. 6, first, a merging point 2 and a branching point 3 that can be directly reached from the merging point 2 are focused on (step 501), and a path extended from the merging point 2 to the branching point 3 is defined as a copying target path (step 502). Blocks D and E along the path between the merging point 2 and the branching point 3 are copied, and the edge is connected from a copied block D' to a copied block E' (step 503). Following the block E', the edge is not connected to the branching point 3, but instead, is directly connected to a block G that is branched at the branching point 3 (step 504). Since the edge that externally flows into the block E is not an edge from a rare path, no process is performed. From among the paths extended from a merging point 4, there are two proposed paths that can be copied. Therefore, for the following modification there are two process.

Figure 7:
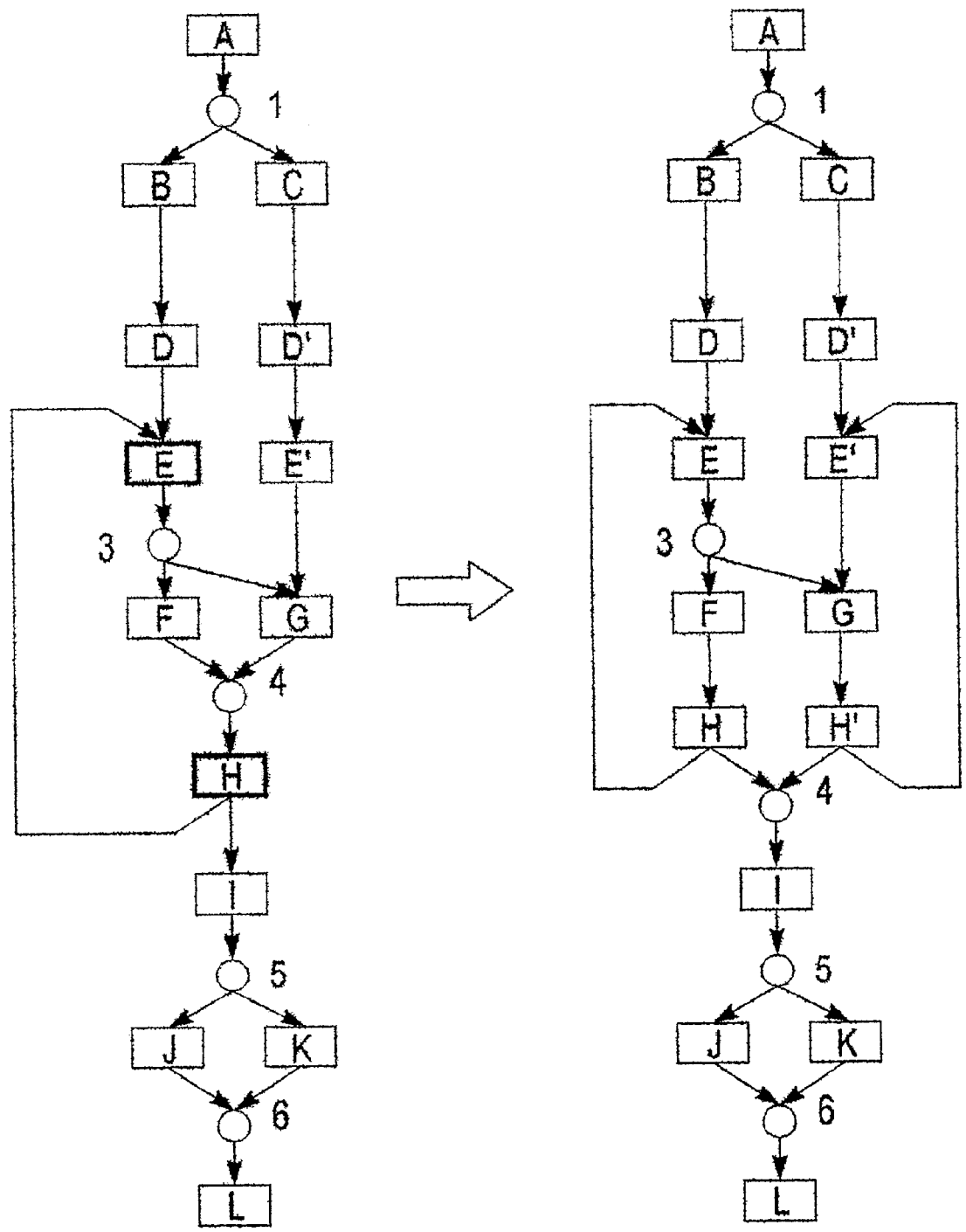
Figure 8:
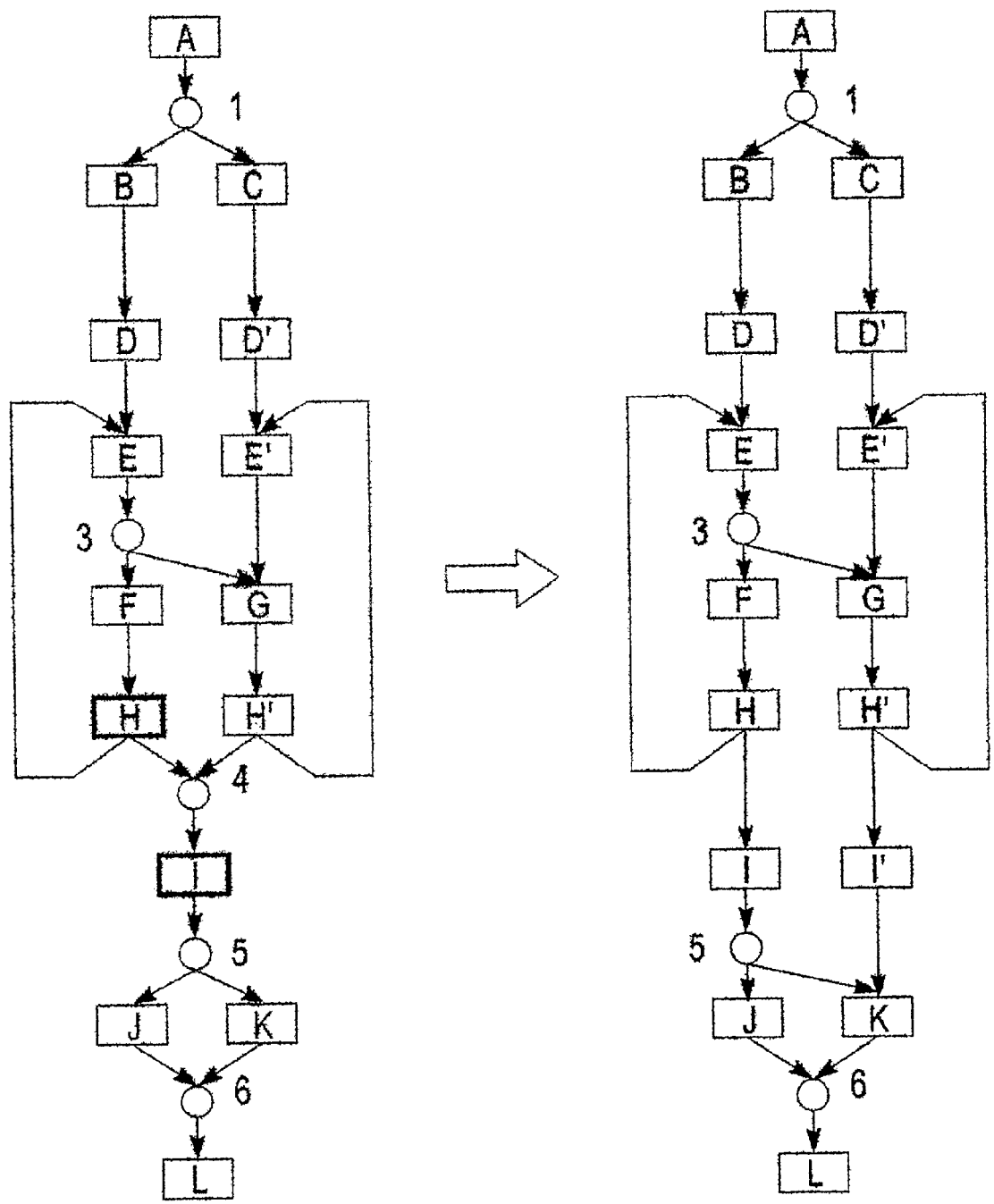

One of the processes is the copying of a path from the merging point 4 to the branching point 3. FIGS. 7 and 8 are diagrams showing the modification of the control flow graph performed in this case.

In FIG. 7, first, blocks H and E along this path are copied (step 503). It should be noted that when the process is initiated at this point, the block E must be copied, but that if it was copied at the preceding step, it need not be copied again. Next, the edge is connected from a copied block H' to a copied block E' (step 503). Since the edge connected to a block I is an edge flowing externally, a new merging point is prepared, and the edges from the blocks H and H' are connected thereto (step 510).

Following this, in FIG. 8, the block I, along the path leading from the merging point 4 to a branching point 5 in the control flow graph in FIG. 7, is copied (step 503), and then, the edge is connected from the block H' to the block I' (step 504). Further, following the block I' the edge is not connected to the branching point 5, but instead is directly connected to a block K that is branched at the branching point 5 (step 504).

Figure 9:
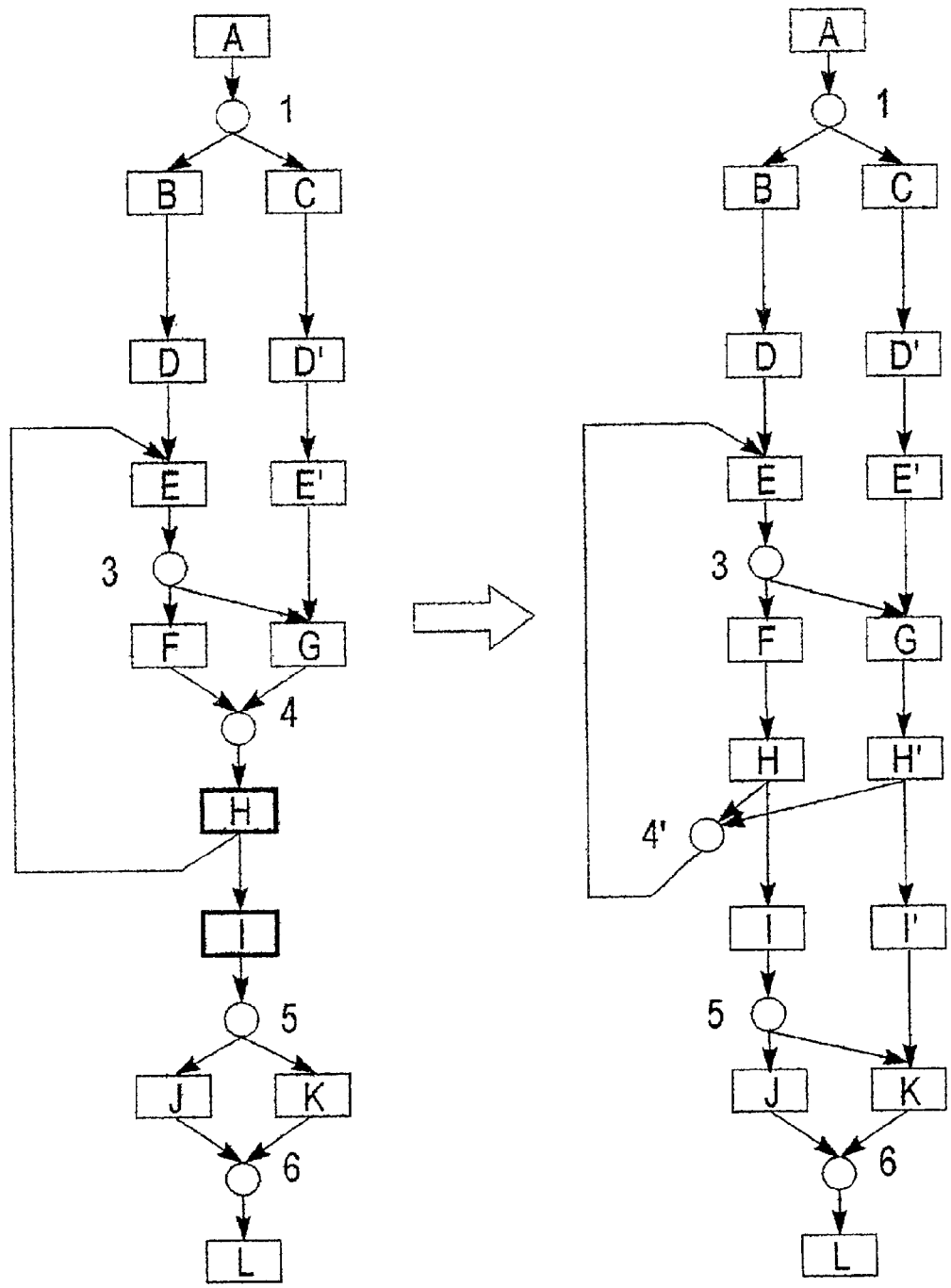
Figure 10:
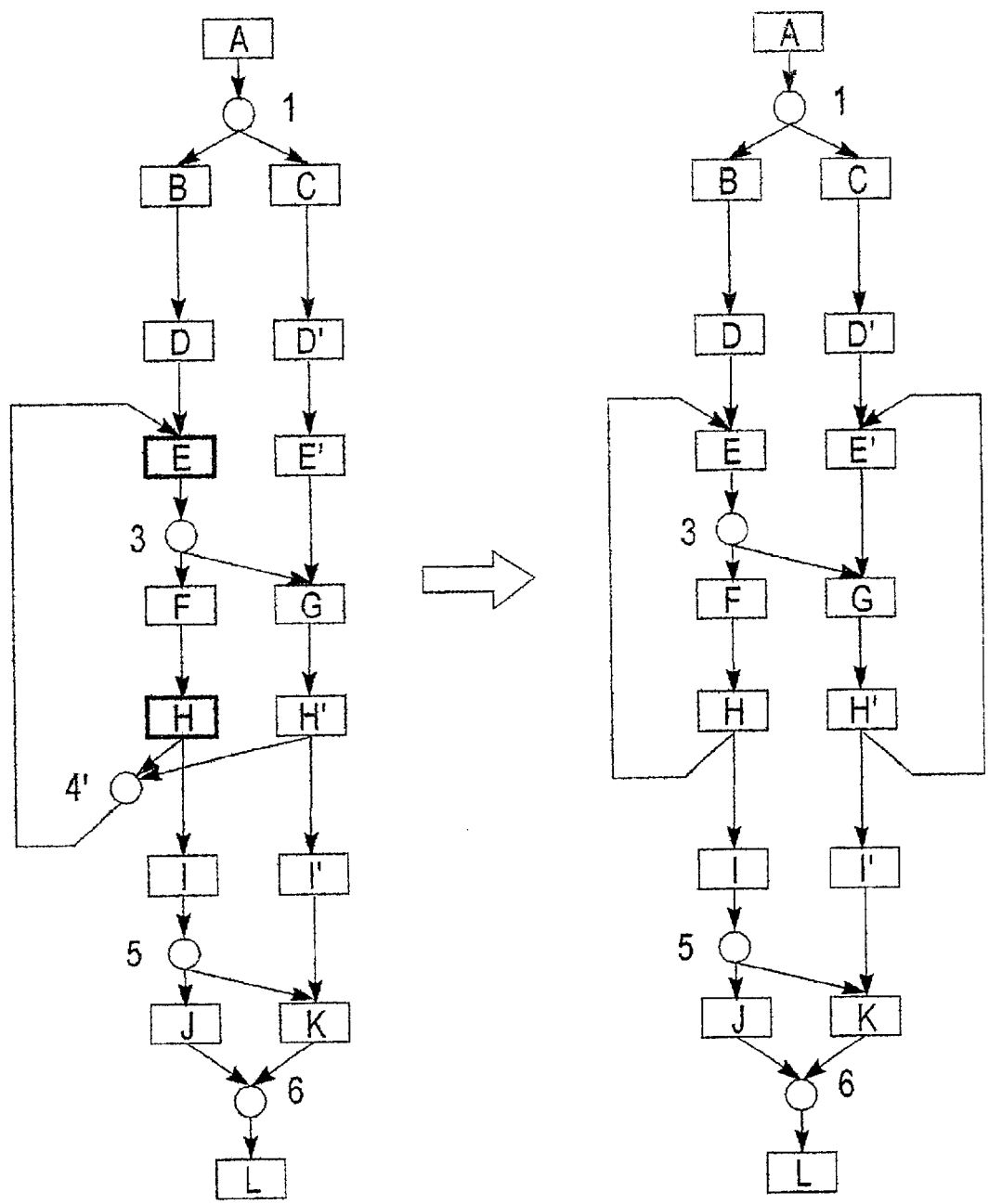
Figure 11:
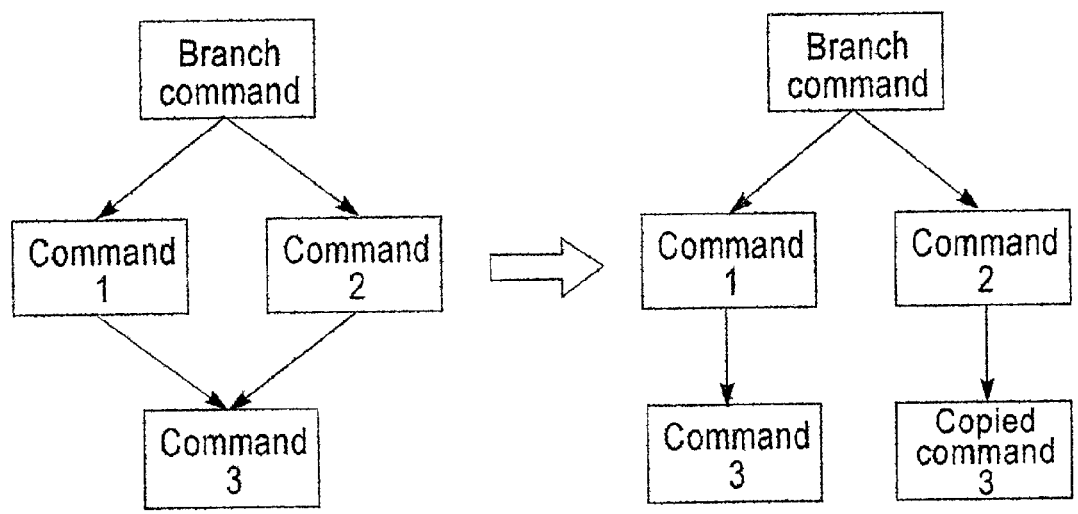
FIG. 11 is a diagram showing the development of a program when a conventional method is used that simply removes merging points of branches.
Figure 12:
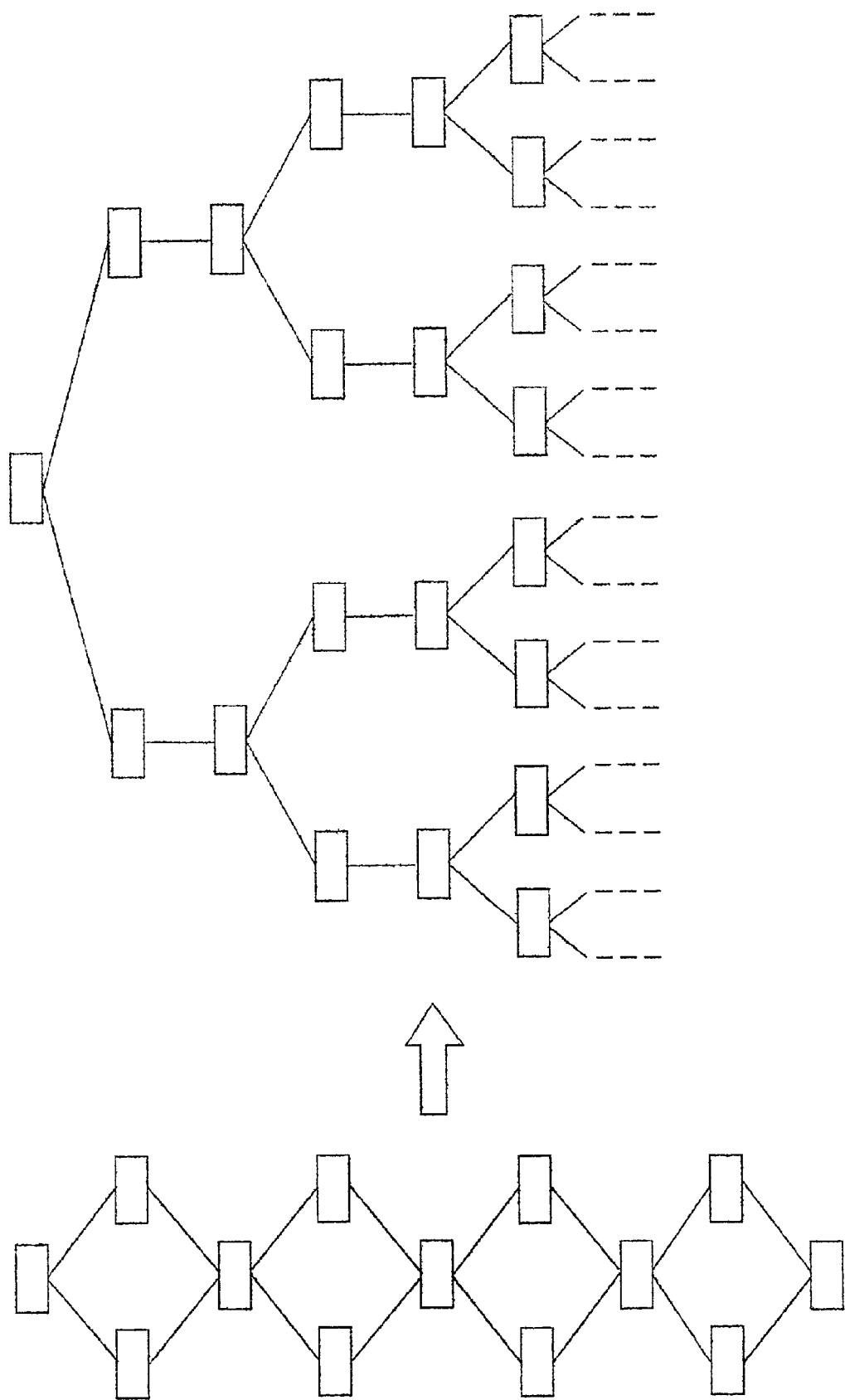
FIG. 12 is a diagram showing the state where the amount of code is drastically increased when a program wherein multiple branches and merges are arranged in series is developed using the conventional method for removing the merges.

The other modification process is a process for copying the path from the merging point 4 to the branching point 5, and FIGS. 9 and 10 are diagrams showing a modification of the control flow graph in this case.

In FIG. 9, first, a block H and a block I along this path are copied, and the edge is connected from a copied block H' to a copied block I' (step 503). Following the block I', the edge is not connected to the branching point 5, but instead is connected to a block K that is branched from the branching point 5 (step 508). Further, since the edge connected to a block E is an edge that flows externally, a new merging point is prepared and the edges from the blocks H and H' are connected thereto (step 510).

Following this, in FIG. 10, the block E along the path between the merging point 4 and the branching point 2 is copied (step 503). However, if the block E was copied at the preceding step, at this time, only the edge is led from the block H'to the block E', and since the edge externally flowing into the block E is not an edge from a rare path, no process is performed.

While referring to FIGS. 8 to 10, regardless of whether the process (FIGS. 7 and 8) for copying the path from the merging point 4 to the branching point 3, or the process (FIGS. 9 and 10) for copying the path from the merging point 4 to the branching point 5 is performed for modification, the same control flow graph is finally obtained.

In the described manner, the control flow graph shown in FIG. 6 is developed into the optimization target path A-B-D-E-F-H-I-J-L, which consists of the main paths, and a path A-C-D'-E'-G-H'-I'-K-L, which consists of rare paths and for which the optimization effects are not taken into account. Thereafter, the optimization execution unit 13 performs the optimization process for the optimization target path A-B-D-E-F-H-I-J-L.

It is to be understood that the present invention, in accordance with at least one presently preferred embodiment, may be implemented on at least one general-purpose computer running suitable software programs. It may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A compiler for converting source code for a program written in a programming language into an object program written in a machine language comprising:

an optimization execution unit for performing optimization of said object program written in said machine language; and a program modification unit for, before said optimization process is performed by said optimization execution unit, modifying said object program to provide a form that is appropriate for said optimization, wherein, when said object program includes a branch into a series of paths, said program modification unit selects at said branch a specific path to extract, relative to said branch, from the series of paths such that the series of paths are not merged.

2. The compiler according to claim 1, wherein said optimization execution unit performs said optimization for said paths that are extracted by said program modification unit.

3. The compiler according to claim 1, wherein, when differences in execution frequencies depend on a plurality of paths at said branch in said object program, said program modification unit selects a path having a higher execution frequency, and relative to said branch, extracts a series of paths that are not merged.

4. A compiler, for converting source code for a program written in a programming language into an object program in a machine language, comprising:
 a path determiner, for selecting, when said object program in said machine language includes a branch, a specific path at said branch for determining a series of target paths for optimization;
 a control flow graph modification unit, for modifying a control flow graph for said object program to separate said optimized target paths from other paths; and
 an optimization execution unit for employing said control flow graph obtained by said control flow graph modification unit to perform optimization of said optimization target paths.

5. The compiler according to claim 4, wherein said control flow graph modification unit extracts said optimization target paths from said control flow graph for said object program, and defines said optimization target paths as paths that, relative to said branch, are not to be merged; and copies path segments that are included in said optimization target paths and connects said copies of said path segments to paths other than those for said optimization target paths, thereby separating said control flow graph into said optimization target paths and into paths that are formed using said copies of said path segments and said paths that are not included in said optimization target paths.

6. The compiler according to claim 5, wherein, from among the paths included in said optimization target paths, said control flow graph modification unit copies path segments at locations other than those whereat said object program branches into a plurality of paths, and connects the copies of said path segments to said paths that are not included in said optimization target paths.

7. A computer system that includes a compiler, for converting source code for a program written in a programming language into an object program in a machine language, comprising:
 a path determiner, for selecting, when said object program in said machine language includes a branch, a specific path at said branch for determining a series of target paths for optimization;
 a control flow graph modification unit, for modifying a control flow graph for said object program to separate said optimized target paths from other paths; and
 an optimization execution unit for employing said control flow graph obtained by said control flow graph modification unit to perform optimization of said optimization target paths.

8. An optimization method, for performing optimization to improve process efficiency of a program, comprising the steps of:
 selecting, when a program includes a branch, a specific path at said branch for determining a series of target paths for optimization;
 modifying a control flow graph for said program to separate said optimized target paths from other sub-paths; and
 employing said control flow graph obtained by said control flow graph modification unit to perform optimization of said optimization target paths.

9. The optimization method according to claim 8, wherein said step of modifying said control flow graph includes steps of:
 copying all optimization target paths, for a sub-path that is led to an optimization target path, that can be reached from a point whereto said sub-path is led;
 copying all the paths that extend from said point whereto said sub-path is led to the copied paths;
 changing the connections of all the edges of said optimization target path from said sub-path to the connections for said copied paths;
 changing, when there is an edge that externally flows to said optimization target path and when said edge is said edge of said sub-path, the connection of said edge connecting said edge to said copied paths; and
 forming a merging point, consisting of a first block at a starting point for said edge and a second block along a copied path that corresponds to said first block, and replacing an edge that flows out from said optimization target path with an edge from said merging point.

10. The optimization method according to claim 9, wherein, at said two steps of copying paths, the copying of a path is eliminated for a location whereat said program branches into a plurality of paths.

11. An optimization method for performing optimization in order to improve the processing efficiency of a program comprising the steps of:
 when a program includes a branch into a series of paths, selecting at said branch at least one specific path to extract, relative to said branch, from the series of paths such that the series of paths are not merged; and
 performing optimization for said selected path.

12. The optimization method according to claim 11, wherein, at said step of extracting paths from said program, when differences in execution frequencies depend on a plurality of paths at said branch in said object program, a path having a higher execution frequency is selected, and a series of paths that are not merged are selected relative to said branch.

13. An optimization program for permitting a computer to perform optimization of an object program, which comprises:
 a process for selecting, when said object program in said machine language includes a branch, a specific path at said branch for determining a series of target paths for optimization;
 a process for modifying a control flow graph for said object program to separate said optimized target paths from other sub-paths; and
 a process for employing said obtained control flow graph to perform optimization of said optimization target paths.

14. A storage medium on which input means for a computer stores a computer-readable program that permits said computer to perform:
 a process for selecting, when said object program in said machine language includes a branch, a specific path at said branch for determining a series of target paths for optimization;
 a process for modifying a control flow graph for said object program to separate said optimized target paths from other sub-paths; and a process for employing said obtained control flow graph to perform optimization of said optimization target paths.

15. A program transmission apparatus comprising:

storage means for storing a program that permits a computer to perform a process for selecting, when said object program in said machine language includes a branch, a specific path at said branch for determining a series of target paths for optimization, a process for modifying a control flow graph for said object program to separate said optimized target paths from other sub-paths, and a process for employing said obtained control flow graph to perform optimization of said optimization target paths; and transmission means for the reading of said program from said storage means and the transmission of said program.

16. A program storage device readable by machine, tangibly embodying a program of instructions executable by the machine to perform an optimization method for improving the processing efficiency of a program, said method comprising the steps of:

when a program includes a branch into a series of paths, selecting at said branch at least one specific path, relative to said branch, from the series of paths such that the series of paths are not merged; and performing optimization for said selected path.

* * * * *